(12) United States Patent
Gennetten

(10) Patent No.: US 6,621,923 B1
(45) Date of Patent: Sep. 16, 2003

(54) COLOR AND TONE CORRECTION OF A NEGATIVE FILM SCAN USING EXISTING SILVER-HALIDE PRINT

(75) Inventor: K Douglas Gennetten, Ft Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/280,735

(22) Filed: Mar. 29, 1999

(51) Int. Cl.⁷ .............................. G06K 9/00; H04N 1/46; G03F 3/08
(52) U.S. Cl. ................... 382/162; 382/167; 382/168; 358/506; 358/518; 358/522; 358/527
(58) Field of Search ................... 382/162–173; 358/504–523, 487, 5.6, 522, 527, 518–520, 455–458, 406; 355/18, 32

(56) References Cited

U.S. PATENT DOCUMENTS

| | | | | |
|---|---|---|---|---|
| 3,724,947 A | * | 4/1973 | Paulus | 355/38 |
| 4,663,663 A | * | 5/1987 | Lee | 358/80 |
| 4,677,465 A | * | 6/1987 | Alkofer | 358/80 |
| 4,729,016 A | * | 3/1988 | Alkofer | 358/80 |
| 4,740,820 A | * | 4/1988 | Endo | 355/20 |
| 4,745,465 A | * | 5/1988 | Kwon | 358/80 |
| 5,084,727 A | * | 1/1992 | Maronian et al. | 355/68 |
| 5,107,332 A | * | 4/1992 | Chan | 358/80 |
| 5,185,673 A | | 2/1993 | Cobol | 358/296 |
| 5,477,353 A | * | 12/1995 | Yamasaki | 358/487 |
| 5,523,849 A | * | 6/1996 | Jamzadeh | 358/1.9 |
| 5,528,339 A | * | 6/1996 | Buhr et al. | 355/32 |
| 5,761,339 A | * | 6/1998 | Ikeshoji et al. | 382/176 |
| 5,982,473 A | * | 11/1999 | Miura | 355/45 |
| 6,157,735 A | * | 12/2000 | Holub | 382/167 |
| 6,175,427 B1 | * | 1/2001 | Lehmbeck et al. | 358/1.9 |
| 6,233,059 B1 | * | 5/2001 | Kodaira et al. | 358/1.9 |

* cited by examiner

Primary Examiner—Andrew W. Johns
Assistant Examiner—Amir Alavi
(74) Attorney, Agent, or Firm—Steven L. Webb (57) ABSTRACT

A method that creates a high detail reproduction of an image that closely matches the color and tone of an existing photograph. Scanning the original negative of the image retrieves the image detail. Scanning an existing photograph of the image retrieves the color and tone information. The image detail information and the color and tone information are then combined to create a high detail reproduction of the image that closely matches the color and tone of the existing photograph.

13 Claims, 6 Drawing Sheets

COLOR AND TONE CORRECTION OF A NEGATIVE FILM SCAN USING EXISTING SILVER-HALIDE PRINT

FIELD OF THE INVENTION

This invention relates generally to color correction techniques used in digital color printing and more particularly to improve the color print quality of color printers when reproducing images that have been scanned by a digital scanner. The present invention provides a method and means for creating a high-resolution reproduction of an image that more closely matches the color and tone of an existing photograph made with a traditional photo-finishing process.

BACKGROUND OF THE INVENTION

Scanners are devices that transform an optical image of a document into electronic form. Scanners typically have lenses and mirrors that focus an image of the page to be transformed onto a photo sensor array, a lamp to illuminate the page to be transformed, and a photo sensor array that coverts the image into an electronic signal. The photo sensor array is typically a charged-coupled device (CCD). The area of the page focused onto the CCD is usually referred to as the "scan line". The direction along the scan line is typically called the scan width or X-direction. The entire object is scanned by sweeping the illuminated scan line across the entire object, either by moving the object with respect to the illumination and optical assemblies, or by moving the illumination and optical assemblies relative to the object. The direction of relative movement is typically called the scan length or Y-direction.

The native or optical resolution of a scanner in the x direction is typically the size or area of the page that is imaged onto the photo sensor element. For an 5.3-micron wide photo sensor with an 8 to 1 magnification ratio in the optical path, the width on the page is $1/600$ inch (0.0423mm), giving the scanner a native resolution of 600 samples per inch (spi) (23.622 samples per mm).

The optical or native resolution of a scanner in the y direction is a function of the area of the page that is imaged onto the photo sensor element, the sweep rate of the photo sensor element with respect to the page, and the exposure time of the photo sensor. For example, a scanner that has an image of the photo sensor on the page of $1/600$ inch, a sweep rate of $1/600$ inch in 5 milliseconds, and an exposure time of 5 milliseconds, would have a native scan resolution in the y direction of 600 samples per inch.

Today most scanners capture the scan information in red, green, and blue colors. The scan data is 3 numbers representing the amount of red, green, and blue light detected at each sample area on the scan. The numbers vary in range depending on the bits used in representing each color. For example, an 8-bit number can range between zero and 255 in value where a 12-bit number can range between zero and 4096. A 24-bit scan would have three 8-bit color values for a total of 24 bits of information. Each of the three color values in the 24-bit scan could represent 256 levels of that color.

Today a user can digitally reproduce an image of a color photograph in two different ways. The first way is to scan an existing photograph and then print the image using a color printer. This method can match the color of the photograph fairly well but may lack some of the detail that was contained in the original negative used to create the color photograph. This is especially true if the user wants to enlarge the size of the original image.

The second method is to scan the original negative of the color photograph and then print an image on a color printer. With this method the detail of the original negative is captured and can be reproduced. However the color of the reproduced image rarely matches the color of the photograph created using traditional photo-finishing methods. The color miss-match between the reproduced image and the original photograph can be quite large. Because the scanned image is digitized, some tone and color adjustments are possible using image editors, but there is no simple linear transformation that will fix all errors without introducing other errors. This leaves the user with a choice between a low detail, well-matched color reproduction or a high detail, poorly matched color reproduction. There is a need for a system that provides a high detail, well-matched color reproduction of a color photograph.

SUMMARY OF THE INVENTION

A method is disclosed that creates a high detail reproduction of an image that closely matches the color and tone of an existing photograph. The image detail is retrieved by scanning the original negative of the image. Scanning an existing photograph of the image retrieves the color and tone information. The image detail information and the color and tone information are then combined to create a high detail reproduction of the image that closely matches the color and tone of the existing photograph.

DETAILED DESCRIPTION OF THE PREFERRED EMBODIMENT

Using a scan of a photograph in conjunction with a scan of the negative enables the creation of a high detail copy that duplicates the color and tone of the original photograph. This allows a user to duplicate or enlarge a "prized" photo from a roll of film without a loss of color fidelity. The enlargement will preserve the higher detail of the negative while maintaining the color fidelity of the original photo. With the advent of products that can scan both color photos and color negatives, like the Hewlett-Packard® S20 PhotoSmart Photo Scanner, a high detail color matched reproduction can be created in the home by using an embodiment of this invention.

The data from two scans are used to create the high detail color matched reproduction. The two scans are: (1) a high resolution (1200 to 2400 spi) high bit depth (24 to 36 bits) color scan of the negative and (2) a lower resolution (150 to 300 spi) high bit depth (24 bits) color scan of the photograph.

Today most scanners, including the Hewlett-Packard® S20 PhotoSmart Photo Scanner, capture the scan information in red, green, and blue colors. In the first embodiment of the invention the scan data is translated into the cyan, magenta, and yellow (CMY) color space. The translation of RGB to CMY is well known in the art. By using the CMY color space it can be easier to match the original photograph that is typically created with CYM dyes. A histogram is created for each of the CYM colors in the lower resolution scan of the original photograph.

Figure 1:
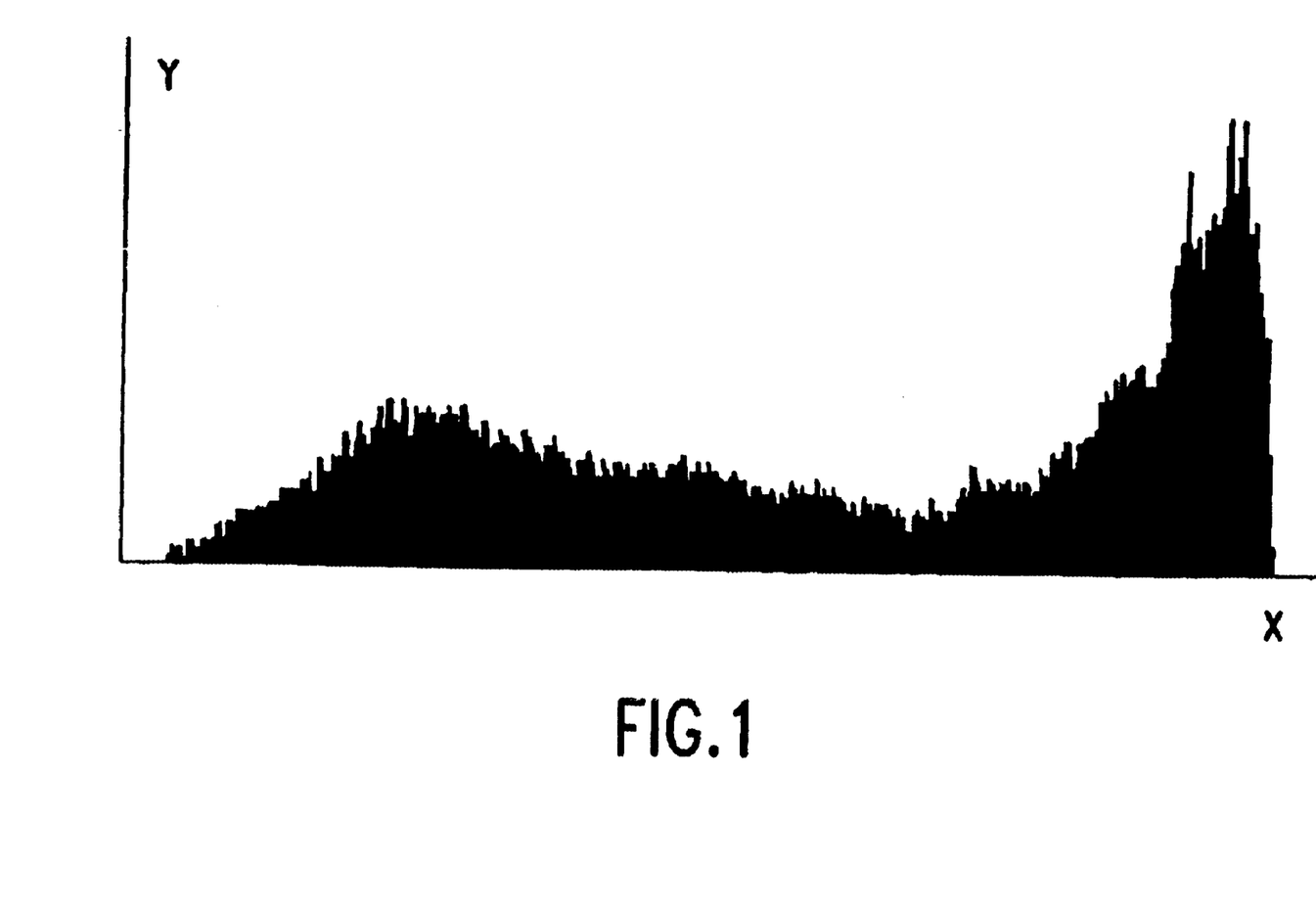
FIG. 1 is a histogram of one color of an image.

A histogram is created by plotting how many times in the image each color level occurred (see FIG. 1). The x-axis of the histogram plot is the number of levels that are measured for that color. For example, a 24 bit scan has 8 bits per color, which gives 256 levels for each color, so the histogram for each color would have 256 points along the x-axis. Each point or value along the x-axis is like a bucket holding the number of pixels in the image that has that value. The y-axis is the total number of samples that have a particular value. For example an image that is 1 inch by 1 inch in size, sampled at 60 spi using 8-bit grayscale would have 3,600 samples. Each sample could have a value between zero and 255. If the image were all the same shade of gray with a reflectance of 31 the histogram plot would have a single bar at point 31 on the x-axis that was 3600 high.

Histograms of photographs typically have prominent features, such as peaks, valleys, and overall extents (see FIG. 1) that occur in the histogram of each color. The histogram from the negative must be inverted to be compared to the histogram created from the photograph. When the histogram of one color of a color photograph is compared to the inverted histogram of the same color from a scan of the negative used to create the color photograph, there is a similarity in the prominent features of the two histograms. The overall extent, the end point intercepts, and the ratio of the heights of the peaks may be different due to differences in the dynamic range of the two scans and the gamma correction between the two scans. Gamma correction is well known in the art (see page 455 of "The Reproduction of Colour" by Dr. R. W. G. Hunt ISBN 0 86343 381 2).

In the first embodiment of the invention the color matching between the scan of the photograph and the scan of the negative is done by histogram matching of the negative histograms to the histograms of the color photograph. The histograms for each color, in CYM space, of the negative scan are matched to the corresponding CYM histograms from the original photograph. The histogram matching occurs in two steps. The first step is matching an end point of the two histograms. The second step is to adjust the range of the histogram and line up the prominent features in each of the histograms.

Figure 2A:
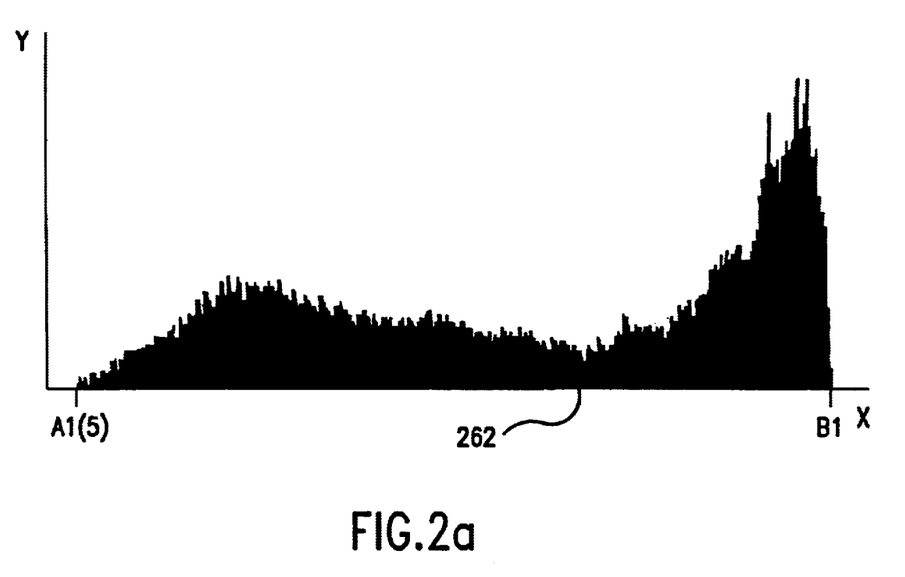
FIG. 2 is an example of two histograms, one created from a photograph and one created from the negative of the photograph.
Figure 2B:
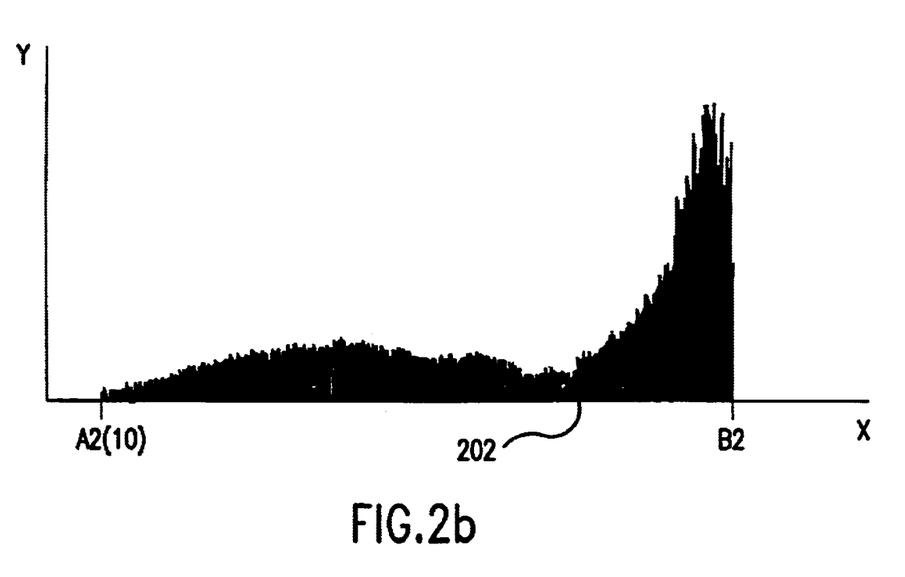

FIG. 2 shows two histograms. Histogram 202 is an example of a histogram of a single color from a color photograph (Photo). Histogram 262 is an example of an inverted histogram of the same color from the negative used to create the color photograph (Neg.). Points A1 and A2 are the minimum histogram value for their respective histogram. Points B1 and B2 are the maximum histogram value for their respective histogram.

Figure 3A:
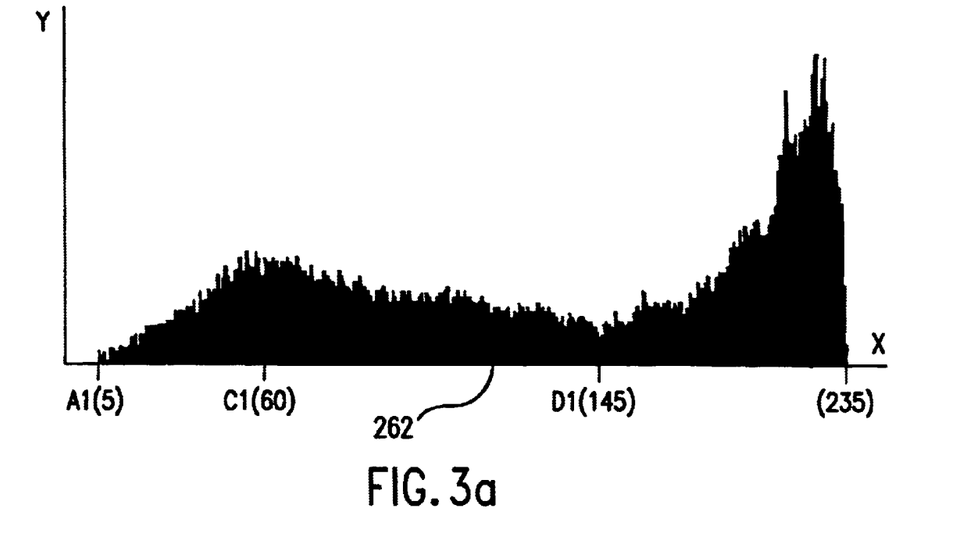
FIG. 3 is the histograms from FIG. 2 aligned at the minimum histogram value in accordance with the present invention.
Figure 3B:
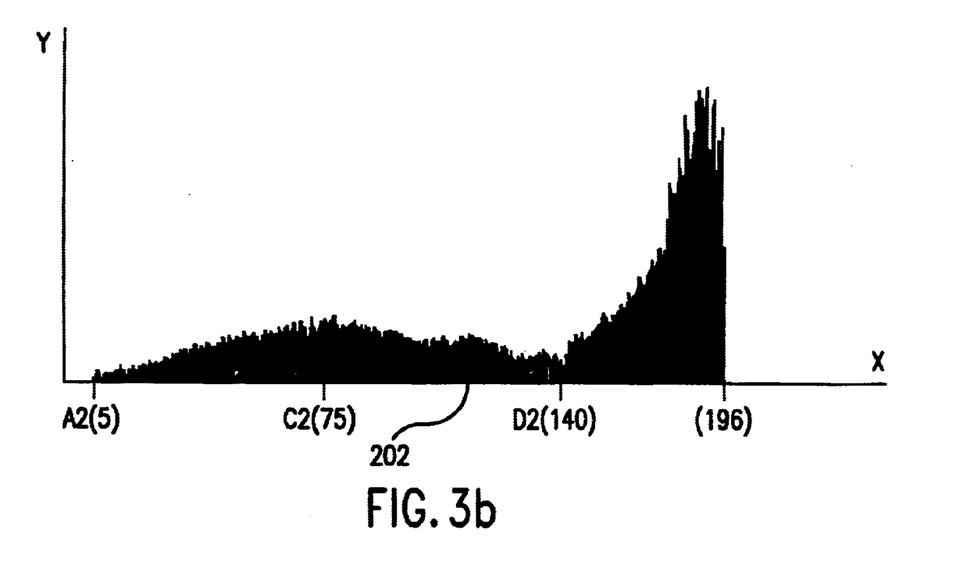

To adjust an end point of histogram 262 (Neg.) to match an end point on histogram 202 (Photo), histogram 262 (Neg.) must be moved to the left until point A1 and A2 align. For example when the minimum histogram value for histogram 202 (Photo) is at 10 and the minimum histogram value for histogram 262 (Neg.) is 5, each value in histogram 202 (Photo) would be moved over by 5 places. A histogram can be shifted to the left by subtracting a value from each pixel in the image. For example subtracting 5 from each pixel value in an image would move the histogram for that image over to the left by 5 places on the x-axis. Shifting each value in histogram 202 (Photo) over to the left by 5 places would align the minimum histogram value of histogram 262 (Neg.) with the minimum histogram value of histogram 202 (Photo) at 5 on the x-axis. FIG. 3 shows histogram 262 (Neg.) and histogram 202 (Photo) after points A1 and A2 have been aligned.

The next step in matching the two histograms is stretching or compressing the range of histogram 262 (Neg.) to match the range of histogram 202 (Photo) and aligning the prominent features or peaks and valleys of the two histograms. The range of a histogram is the minimum value subtracted from the maximum value. When the range of histogram 262 (Neg.) is greater than the range of histogram 202 (Photo), histogram 262 (Neg.) is compressed. When the range of histogram 262 (Neg.) is smaller than the range of histogram 202 (Photo), the range of histogram 262 (Neg.) is stretched.

The range matching and prominent feature matching of the two histograms is done in a multi step process starting at the minimum histogram values that were aligned in the previous step. The first prominent feature to the right of the minimum histogram value is determined for the two histograms. Each point to the right of the aligned points in the two histograms are modified by a formula created with the data from the next points to be aligned. This is repeated until the maximum histogram values for both histograms are aligned. For example in FIG. 3 points C1 and C2 correspond to the first prominent feature to the right of the aligned end points A1 and A2 in the histogram 262 (Neg.) and histogram 202 (Photo). The formula used is P(new)=(P(old)−Pa)(PFP−Pa)/(PFN−Pa)+Pa where P(new) is the value of the modified point, P(old) is the value of the point to be modified, Pa is the value of the point previously aligned, PFN is the value of the prominent feature in the negative histogram to be aligned, and PFP is the value of the prominent feature in the photograph histogram to be aligned. For example, in FIG. 3 points A1 and A2 are already aligned so Pa would have a value of 5. C1 is the prominent feature to be aligned in the negative histogram so PFN would be 60. C2 is the prominent feature to be aligned in the photograph histogram so PFP would be 75. The equation used to modify each point in histogram 262 (Neg.) to the right of the aligned points A1 would be P(new)=(P(old)−5)(75−5)/(60−5)+5. This will result in the alignment of points C1 and C2 at position 75.

Figure 4A:
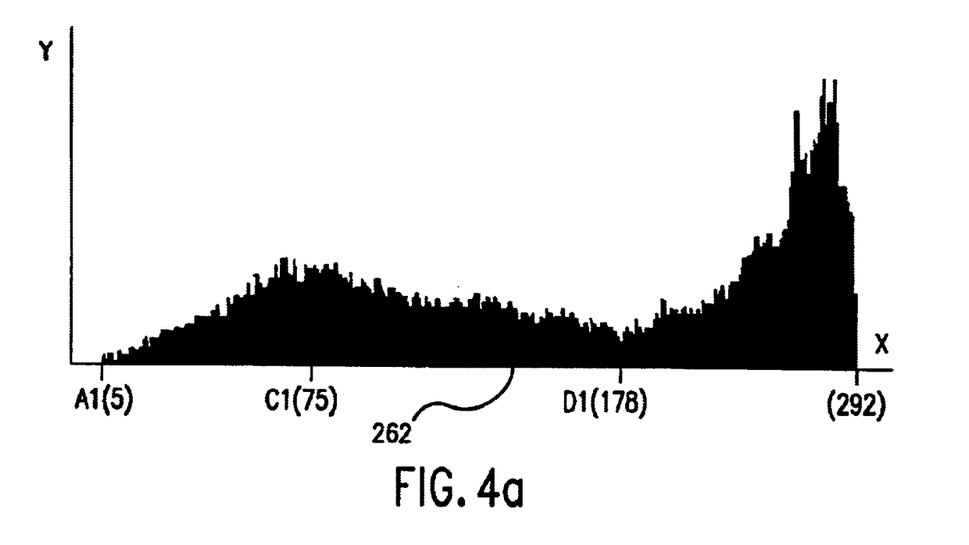
FIG. 4 is the histograms from FIG. 3 with points C1 and C2 in alignment in accordance with the present invention.
Figure 4B:
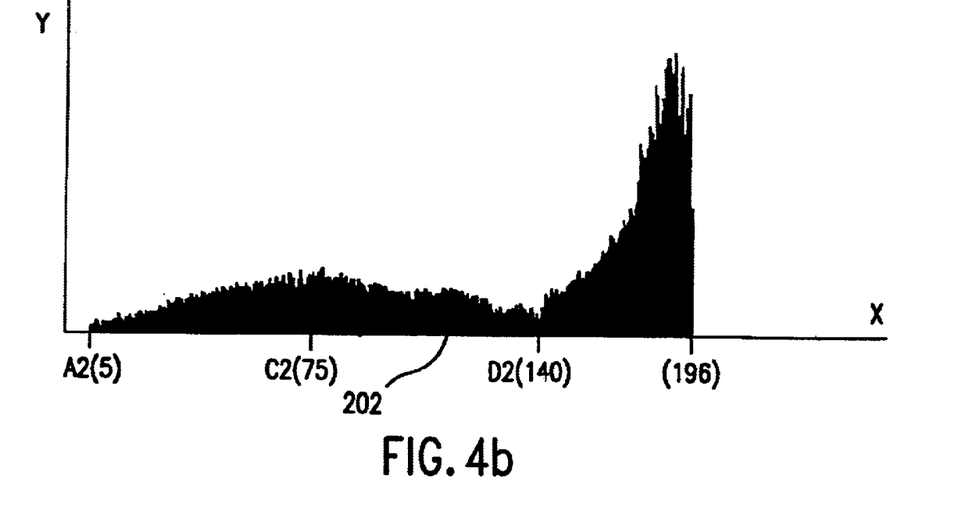

Once prominent features C1 and C2 are aligned the process is repeated starting at the newly aligned prominent features C1 and C2. For example FIG. 4 shows histograms 262 (Neg.) and histogram 202 (Photo) after points C1 and C2 have been aligned. Points D1 and D2 are the next prominent features to the right of the currently aligned points C1 and C2. The new formula would be P(new)=(P(old)−75)(140−75)/(178−75)+75. Each value in histogram 262 (Neg.) to the right of the already aligned points C1 would be modified using this new equation. This will result in the alignment of points D1 and D2 at position 140.

This process is repeated for each prominent feature in the histograms until the maximum histogram values of the two histograms are aligned. This process is repeated for the histogram of each color, in CYM space, for the scan of the negative. Once all three histograms from the scan of the negative have been adjusted to match the histograms from the scan-of the photograph, the image can be printed producing a high detail, well color matched print.

Figure 5:
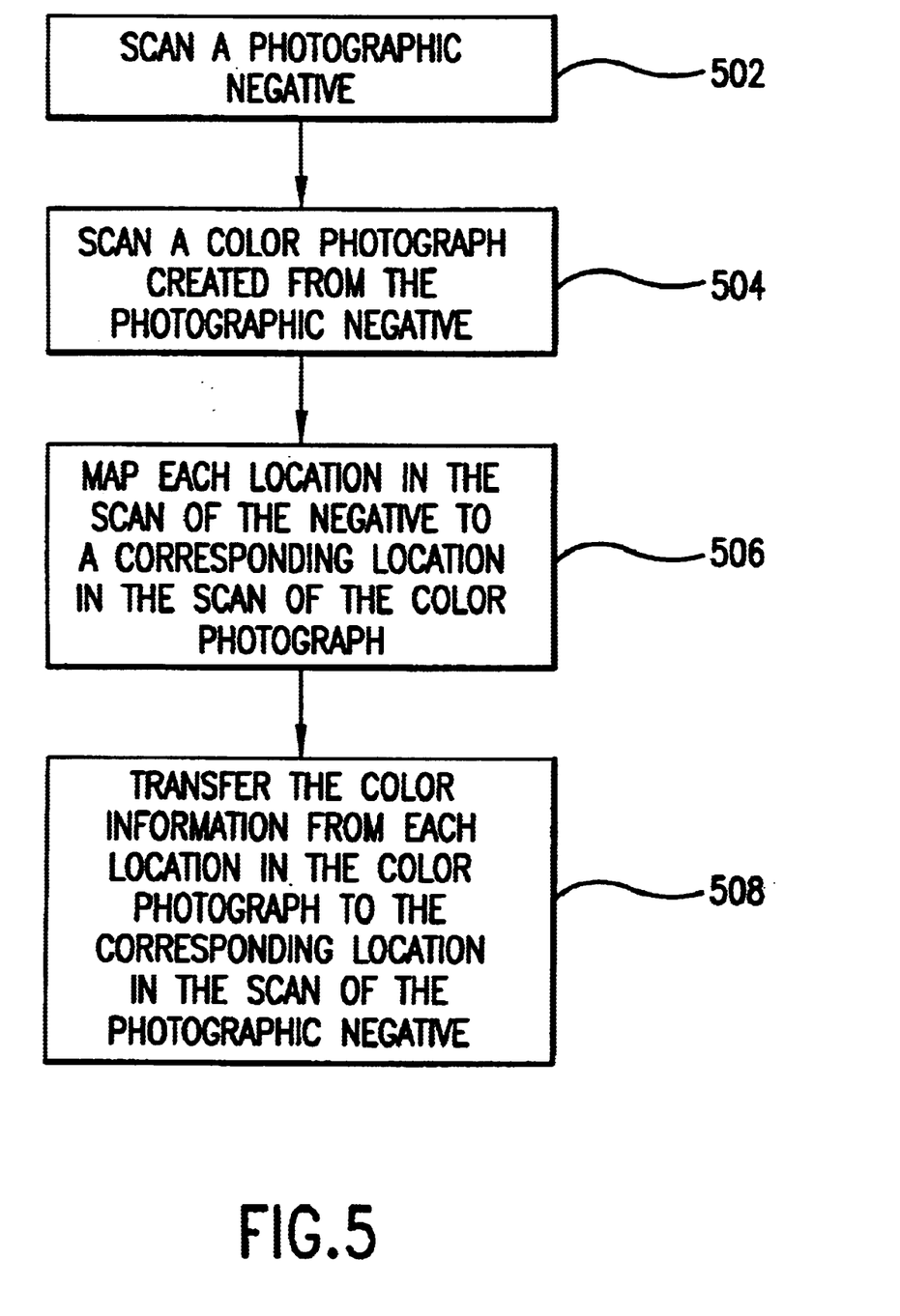
FIG. 5 is a flow chart of a method in accordance with the present invention.
Figure 6A:
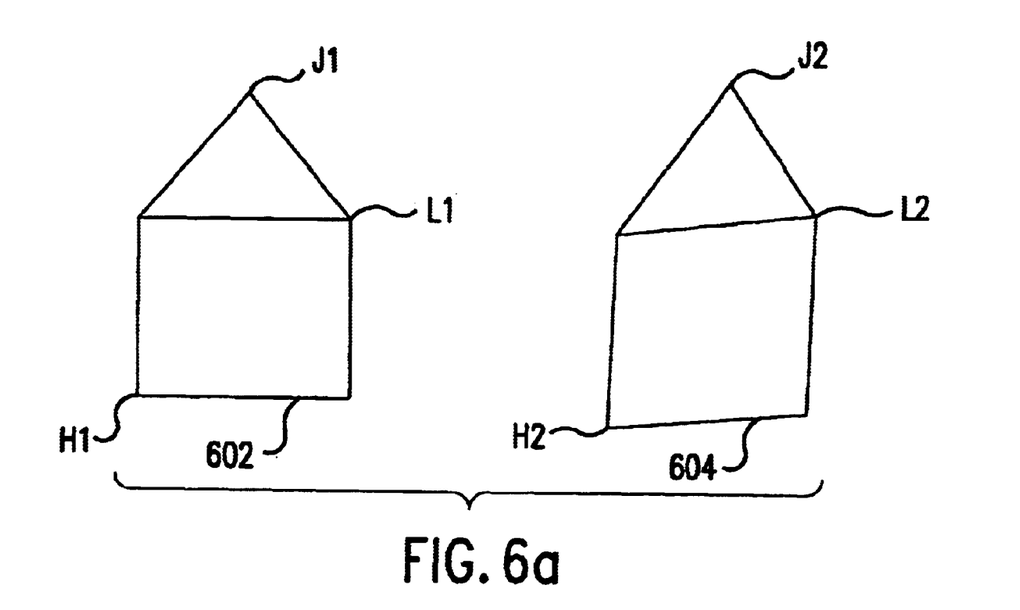
FIG. 6a is a sketch of the possible distortions between an image scanned from a photograph and an image scanned from a negative.
Figure 6B:
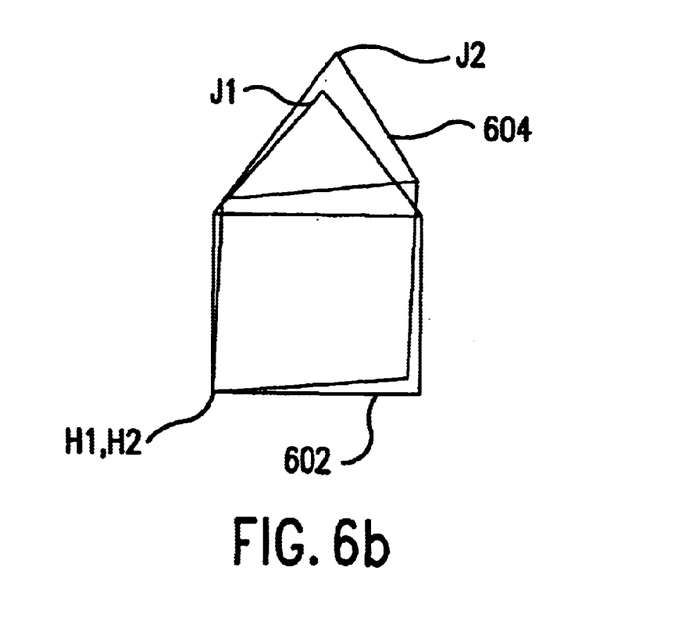
FIG. 6b is the two images from FIG. 6a superimposed on top of each other.

A method for the preferred embodiment of the invention is show in FIG. 5. A scan of a photographic negative is done in 502. A scan of a color photograph created from the photographic negative is done in 504. The order of the two scans is not important. Once both scans have been completed, each location in the scan of the negative is mapped to a corresponding location in the scan of the color photograph 506. The color information from the scan of the color photograph is then transferred to the corresponding location in the scan from the photographic negative 508. In the preferred embodiment of the invention the scan of the negative is done as a high-resolution high bit depth (8 to 12 bits) grayscale scan to help minimize the amount of data required. The grayscale data from the negative scan and the color data from the photograph scan are converted into a color space that separates the luminance information from the chromatic information. One color space that separates the luminance and chrominance information is CIELAB. In CIELAB, gray scale (luminance) is encoded in one dimension in 3-D space and color (chrominance) is encoded in the other two dimensions. The conversion of RGB into CIELAB is well known in the art. Once both images are in the CIELAB color space, the chrominance information for each pixel from the original photograph is copied to the corresponding pixel in the image created from the scan of the negative. This gives an exact match of the tone and color from the original photograph while maintaining the high detail from the negative. Because the optical paths of the negative scan and the scan of the photograph are different, there may not be a linear relationship between the pixels in the image from the photograph and the image from the negative. The shape in one scan may be distorted compared to the same shape in the other scan. For example, FIG. 6a illustrates a shape 602 simulating the reproduction from a scan of a photograph and the same shape 604 simulating the reproduction from a scan of the negative. Points H1, J1 and L1 are three points on shape 602. Points H2, J2, and L2 are the corresponding points on shape 604. The two shapes are overlaid by aligning points H1 and H2 in FIG. 6b, and the other points J1, J2, L1, and L2 do not line up. FIG. 5a is an example of some of the possible distortions but does not show all the possible distortions between two scans using different optical paths. An affine transformation is used to find the pixels from the negative scan for the corresponding pixels in the image of the original photograph.

Affine transformations can rotate, scale, shear, translate, and transform perspectivly. An affine transformation matrix is a 3×3 matrix that has a one for the lower right hand coefficient when there is no global scaling. The location of any point in one image can be mapped to a new location in a second image by the transform $$[p, q, 1] = \begin{bmatrix} a, b, c \\ d, e, f \\ g, h, 1 \end{bmatrix} * [x, y, 1].$$

To determine the coefficients in the transformation matrix, the location of three points in one image are matched to the corresponding three points in the second image. With the coordinates for 3 points in each image 9 equations can be written in the 8 unknown coefficients a, b, c, d, e, f, g, and h. Solving the 9 equations simultaneously for the 8 unknowns will give the values for each of the coefficients in the affine transformation matrix. Once the affine transformation matrix is known each pixel in the image scanned from the negative can be mapped into the corresponding image from the original photograph by using the affine transformation equation.

For example, points (0,0), (1,0), and (1,1) are locations in the scanned image from the original photograph and points (0.9138, −.4449), (1.898, −0.2713), and (1.7249, 0.7135) are the corresponding point in the scanned image created from the negative. The 9 equations in the unknown coefficients are:

$$0a + 0d + g = .9138 \quad \text{giving } g = .9138$$
$$1a + 0d + g = 1.898 \quad \text{giving } a = .984$$
$$1a + 1d + g = 1.7249 \quad \text{giving } d = -.173$$
$$0b + 0e + h = -.4449 \quad \text{giving } h = -.4449$$
$$1b + 0e + h = -.2713 \quad \text{giving } b = .1736$$
$$1b + 1e + h = .7135 \quad \text{giving } e = .9848$$
$$0c + 0f + 1 = 1$$
$$1c + 0f + 1 = 1 \quad \text{giving } c = 0$$
$$1c + 1f + 1 = 1 \quad \text{giving } f = 0$$

Therefore the affine translation matrix for mapping each pixel in the image of the photograph into a pixel in the image from the negative, for this example, is $$\text{new}[p, q] = \begin{bmatrix} .984 & .1736 & 0 \\ -.173 & .9848 & 0 \\ .9138 & -.4449 & 1 \end{bmatrix} * \text{old}[x, y].$$

This corresponds to a rotation of 10 degrees and a translation of 3 in the x-axis and 5 in the y-axis. More than three points in each image can be used with a least squared numerical method for finding the coefficients for the affine transformation matrix. A least squared numerical method for solving for 8 unknowns is well know in the art. To minimize the distortion the image can be divided into two or more regions with a common point at the dividing line between each region and multiple affine transforms can be used, one for each image region. Some distortions of the images may not be removed by a single affine transformation but an exact match from pixel to pixel is not required because the human eye is not as spatially sensitive in chroma as in luminance.

Once each pixel in the image from the negative has been mapped to a pixel in the photographic image, the chrominance from the pixel in the photographic image is substituted for the chrominance for that pixel in the image created from the negative. This gives an almost exact match of the color and tone of the original photographic print while preserving the higher detail of the negative.

What is claimed is:
1. A method of producing a high detail, color matched image of a color photograph comprising the steps of:
   a) scanning a photographic negative;
   b) scanning a color photograph that was created from the photographic negative;
   c) adjusting the color in the scan of the photographic negative, using the color from the scan of the color photograph.
2. The method of claim 1 where the adjustment of the color in the scan of the photographic negative is done by matching the histograms of the color from the scan of the color photograph.
3. The method of claim 1 where the color space used when adjusting the color of the scan of the negative is the CMY color space.

4. The method of claim 1 where the scan of the photographic negative is a high resolution, high bit depth scan and the scan of the color photograph is a lower resolution, high bit depth scan.

5. The method of claim 1 where said color photograph was created from said photographic negative using a photofinishing process.

6. The method of claim 1 where said color photograph is a silver-halide print of said photographic negative.

7. A method of producing a color matched image of a color photograph comprising the steps of:
   a) scanning a photographic negative;
   b) scanning a color photograph that was created from the photographic negative;
   c) mapping each location in the scan of the photographic negative to a corresponding location in the scan of the color photograph;
   d) replacing the color information of each of the locations in the scan of the photographic negative with the color information of the corresponding locations in the scan of the color photograph.

8. The method in claim 7 where the color information of the scan of the photographic negative and the scan of the color photograph are both in the CIELAB color space.

9. The method in claim 7 where the mapping of each location in the scan of the photographic negative corresponding to a location in the scan of the color photograph is done with an affine transformation.

10. The method of claim 7 where the scan of the photographic negative is a high resolution, high bit depth scan and the scan of the color photograph is a lower resolution, high bit depth scan.

11. The method of claim 10 Where the high resolution, high bit depth scan is a black and white scan-and the lower resolution, high bit depth scan is a color scan.

12. The method of claim 7 where said color photograph was created from said photographic negative using a photofinishing process.

13. The method of claim 7 where said color photograph is a silver-halide print of said photographic negative.

* * * * *